US012717283B2

(12) United States Patent
Li et al.

(10) Patent No.: US 12,717,283 B2
(45) Date of Patent: Aug. 25, 2026

(54) WEARABLE COMPUTING DEVICE HAVING A BIOMETRIC SENSOR ELECTRODE POSITIONED ON A DISPLAY SCREEN COVER AND OPERABLE AS AN ANTENNA

(71) Applicant: Fitbit LLC, San Francisco, CA (US)

(72) Inventors: Kevin Li, San Diego, CA (US); Teemu Taneli Raafael Kaiponen, San Diego, CA (US); Pieris Berreitter, San Francisco, CA (US); Ritu Verma, San Diego, CA (US)

(73) Assignee: FITBIT, LLC, San Francisco, CA (US)

( * ) Notice: Subject to any disclaimer, the term of this patent is extended or adjusted under 35 U.S.C. 154(b) by 313 days.

(21) Appl. No.: 18/698,823

(22) PCT Filed: Oct. 7, 2021

(86) PCT No.: PCT/US2021/053932

§ 371 (c)(1),
(2) Date: Apr. 5, 2024

(87) PCT Pub. No.: WO2023/059324

PCT Pub. Date: Apr. 13, 2023

(65) Prior Publication Data

US 2025/0004425 A1 Jan. 2, 2025

(51) Int. Cl.
*G04G 21/02* (2010.01)
*G04G 17/06* (2006.01)
(Continued)

(52) U.S. Cl.
CPC ........... *G04G 21/025* (2013.01); *G04G 17/06* (2013.01); *G04G 21/04* (2013.01); *H01Q 1/273* (2013.01); *H01Q 1/44* (2013.01)

(58) Field of Classification Search
None
See application file for complete search history.

(56) References Cited

U.S. PATENT DOCUMENTS

2018/0220972 A1* 8/2018 Jeong .................. A61B 5/7475
2018/0321640 A1 11/2018 Miyoshi
(Continued)

FOREIGN PATENT DOCUMENTS

KR 20200116671 10/2020
KR 20200133456 11/2020
WO WO 2021/172839 9/2021

OTHER PUBLICATIONS

International Preliminary Report on Patentability for Application No. PCT/US2021/053932, mailed Apr. 18, 2024, 8 pages.
(Continued)

*Primary Examiner* — Renee S Luebke
*Assistant Examiner* — Michael James Walker
(74) *Attorney, Agent, or Firm* — DORITY & MANNING P.A.

(57) ABSTRACT

A wearable computing device is provided. The wearable computing device includes a housing and a printed circuit board at least partially disposed within the housing. The wearable computing device includes a display screen electrically coupled to the printed circuit board. The wearable computing device includes a cover positioned on the display screen. The cover includes a top surface and a bottom surface. The bottom surface includes one or more electrical contacts electrically connected to the printed circuit board. The wearable computing device includes a biometric sensor electrode positioned partially on the top surface of the cover. The biometric sensor electrode wraps at least partially around a periphery of the cover and contacts the one or more electrical contacts on the bottom surface of the cover. The biometric sensor electrode has one or more portions that include a conductive material capable of carrying a radio frequency current.

20 Claims, 16 Drawing Sheets

(51) Int. Cl.

| | |
|---|---|
| ***G04G 21/04*** | (2013.01) |
| ***H01Q 1/27*** | (2006.01) |
| ***H01Q 1/44*** | (2006.01) |

(56) References Cited

U.S. PATENT DOCUMENTS

| | | | |
|---|---|---|---|
| 2019/0260116 | A1 | 8/2019 | Wei et al. |
| 2020/0015701 | A1* | 1/2020 | Wei ...................... A61B 5/0006 |
| 2020/0365974 | A1* | 11/2020 | Wei .......................... H01Q 9/42 |
| 2021/0052221 | A1 | 2/2021 | Selvam et al. |
| 2021/0119324 | A1 | 4/2021 | Kang et al. |

OTHER PUBLICATIONS

International Report and Written for Application PCT/US2021/053932, mailed Jun. 22, 2022, 12 pages.

* cited by examiner

WEARABLE COMPUTING DEVICE HAVING A BIOMETRIC SENSOR ELECTRODE POSITIONED ON A DISPLAY SCREEN COVER AND OPERABLE AS AN ANTENNA

PRIORITY CLAIM

This application is based upon and claims the right of priority under 35 U.S.C. § 371 to International Application No. PCT/US2021/053932 filed on Oct. 7, 2021. Applicant claims priority to and the benefit of each of such applications and incorporates all such applications herein by reference in their entirety.

FIELD

The present disclosure relates generally to wearable computing devices. More particularly, the present disclosure relates to a wearable computing device having a biometric sensor electrode that is positioned on a top surface of a cover for a display screen of a wearable computing device and is operable as an antenna.

BACKGROUND

Wearable computing devices (e.g., wrist watches) can include a display screen to display content (e.g., time, date, etc.) to a user. Wearable computing devices can gather data regarding activities performed by the user, or regarding the user's physiological state. Such data may include data representative of the ambient environment around the user or the user's interaction with the environment. For example, the data can include motion data regarding the user's movements and/or physiological data obtained by measuring various physiological characteristics of the user, such as heart rate, perspiration levels, and the like.

SUMMARY

Aspects and advantages of embodiments of the present disclosure will be set forth in part in the following description, or can be learned from the description, or can be learned through practice of the embodiments.

In one aspect, a wearable computing device is provided. The wearable computing device includes a housing and a printed circuit board at least partially disposed within the housing. The wearable computing device includes a display screen electrically coupled to the printed circuit board. The wearable computing device includes a cover positioned on the display screen. The cover includes a top surface and a bottom surface. The bottom surface includes one or more electrical contacts electrically connected to the printed circuit board. The wearable computing device includes a biometric sensor electrode positioned partially on the top surface of the cover. The biometric sensor electrode wraps at least partially around a periphery of the cover and contacts the one or more electrical contacts on the bottom surface of the cover. The biometric sensor electrode has one or more portions that include a conductive material capable of carrying a radio frequency current. In some implementations, the conductive material includes a silver material.

In some implementations, the wearable computing device includes one or more electrical connectors electrically connecting the printed circuit board to the one or more electrical contacts on the bottom surface of the cover. In some implementations, the one or more electrical connectors include a flexible printed circuit having a base portion and a tail portion that is flexible relative to the base portion. In some implementations, the flexible printed circuit includes one or more radio frequency transmission lines disposed on the tail portion of the flexible printed circuit and the base portion of the flexible printed circuit.

In some implementations, the housing includes a conductive housing. In such implementations, the wearable computing device includes one or more dielectric spacers positioned between the conductive housing and the biometric sensor electrode. In some implementations, the cover includes a glass material.

In some implementations, the wearable computing device includes a physical vapor deposition defined coating covering the one or more portions of the biometric sensor electrode that include the conductive material capable of carrying the radio frequency current. For instance, in some implementations, the one or more portions of the biometric sensor electrode include at least one of a first portion of the biometric sensor electrode that is positioned on the top surface of the cover or a second portion of the biometric sensor electrode that is positioned on the bottom surface of the cover. In some implementations, the physical vapor deposition defined coating is at least partially radio frequency transparent. In some implementations, a gap defined between the physical vapor deposition defined coating and an edge of an active display area of the display screen is narrower than a gap defined between the biometric sensor electrode and the edge of the active display area. Furthermore, in some implementations, the gap defined between the biometric sensor electrode and the edge of the active display area is greater than 1 millimeter.

In another aspect, a wearable computing device is provided. The wearable computing device includes a housing and a printed circuit board at least partially disposed within the housing. The wearable computing device includes a display screen electrically coupled to the printed circuit board. The wearable computing device includes a cover positioned on the display screen. The cover includes a top surface and a bottom surface. The bottom surface includes a first electrical contact and a second electrical contact. The first electrical contact and the second electrical contact are each electrically connected to the printed circuit board. The wearable computing device includes a first biometric sensor electrode and a second biometric sensor electrode. The first biometric sensor electrode and the second biometric sensor electrode are spaced apart from one another on the top surface of the cover. The first biometric sensor electrode wraps around a first portion of a periphery of the cover and connects to the first electrical contact on the bottom surface of the cover. The second biometric sensor electrode wraps around a second portion of the periphery of the cover and connects to the second electrical contact on the bottom surface of the cover. Furthermore, at least one of the first biometric sensor electrode or the second biometric sensor electrode has one or more portions that include a conductive material capable of carrying a radio frequency current. In some implementations, the conductive material includes a conductive material.

In some implementations, the one or more portions of the first biometric sensor electrode include a first portion of the first biometric sensor electrode that is positioned on the top surface of the cover and a second portion of the first biometric sensor electrode that is positioned on the bottom surface of the cover. Furthermore, the one or more portions of the second biometric sensor electrode include a first portion of the second biometric sensor electrode that is positioned on the top surface of the cover and a second portion of the second biometric sensor electrode that is positioned on the bottom surface of the cover.

In some implementations, the wearable computing device further includes a first physical vapor deposition defined coating covering the first portion of the first biometric sensor electrode or the second portion of the first biometric sensor electrode. Furthermore, in such implementations, the wearable computing device further includes a second physical vapor deposition defined coating covering the first portion of the first biometric sensor electrode or the second portion.

In some implementations, a gap defined between the first biometric sensor electrode and an edge of an active display area of the display screen is wider than a gap defined between the first physical vapor deposition defined coating and the edge of the active display area of the display screen.

In some implementations, the wearable computing device further includes a first electrical connector and a second electrical connector. The first electrical connector electrically connects the printed circuit board to the first electrical contact on the bottom surface of the cover. The second electrical connector electrically connects the printed circuit board to the second electrical contact on the bottom surface of the cover.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
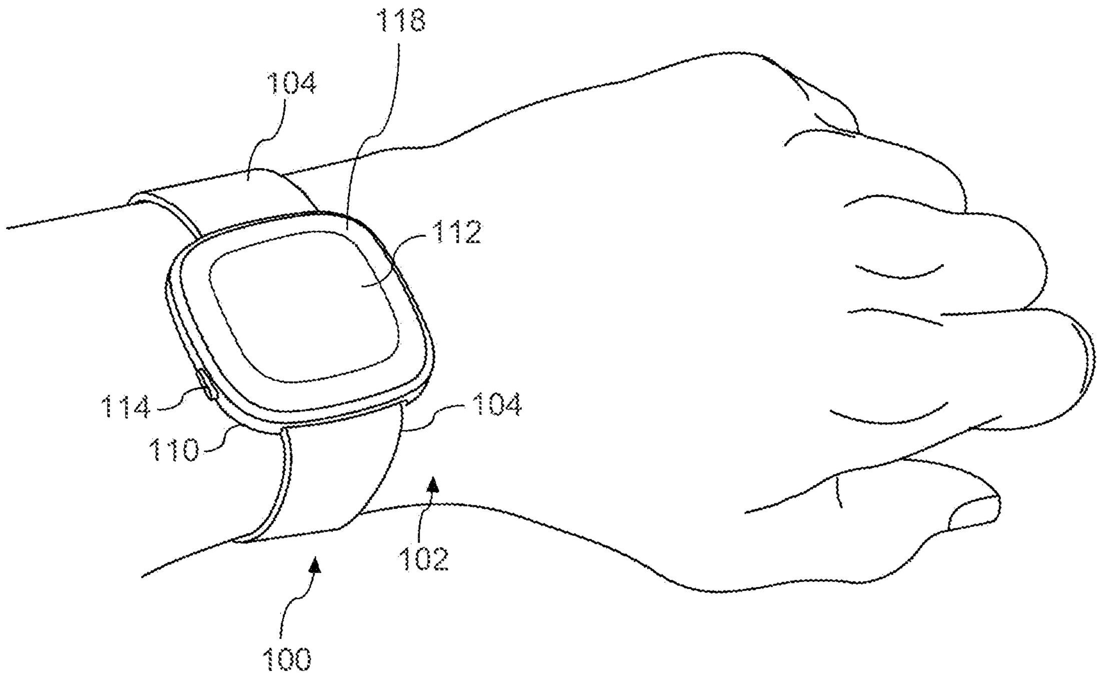
FIG. 1 depicts a wearable computing device according to some implementations of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to a wearable computing device that can be worn, for instance, on a user's wrist. The wearable computing device can include a housing and a printed circuit board at least partially positioned within the housing. The wearable computing device can further include a display screen and a cover positioned on top of the display screen. In this manner, the cover can protect the display screen from being damaged (e.g., scratched). Furthermore, the cover can include an optically transparent material (e.g., glass) so that the user can view information being displayed on the display screen.

The wearable computing device can include one or more biometric sensor electrodes positioned on the cover. More particularly, the one or more biometric sensor electrodes can be at least partially positioned on a top surface of the cover. In this manner, the user wearing the wearable computing device can contact (e.g., touch) the one or more biometric sensor electrodes to perform on-demand biometric measurements. The one or more biometric sensor electrodes can wrap at least partially around a periphery (e.g., edge) of the cover and connect to one or more electrical contacts on a bottom surface of the cover. In this manner, the one or more biometric sensor electrodes can hide from view at least a portion (e.g., dead band) of the area surrounding an active display area of the display screen. It should be understood that the area surrounding the active area of the display screen is referred to as a "dead band" of the display screen. Furthermore, since the one or more biometric sensor electrodes can be used to hide from view at least a portion of the dead band of the display screen, an element (e.g., bezel) is not needed to cover the portion of the area surrounding the active area of the display screen to provide visual enhancement.

The one or more biometric sensor electrodes can include, for instance, a first biometric sensor electrode and a second biometric sensor electrode. For instance, the user can contact (e.g., touch) the first biometric sensor electrode to obtain a first biometric measurement (e.g., electrocardiogram). Alternatively, the user can contact both the first biometric sensor electrode and the second biometric sensor electrode to obtain a second biometric measurement (e.g., electrodermal activity) that is different than the first biometric measurement. In this manner, a user wearing the wearable computing device can perform on-demand biometric measurements by contacting (e.g., touching) at least one of the first biometric sensor electrode or the second biometric sensor electrode. As will be discussed below, the one or more biometric sensor electrodes positioned on the cover can be operable as antennas to facilitate communication between the wearable computing device and other devices (e.g., smartphone, tablet, etc.). For instance, the one or more biometric sensor electrodes can radiate over a range of frequencies (e.g., about 0.6 Gigahertz (GHz) to about 10 GHZ). As used herein, use of the term "about" in conjunction with a numerical value refers to a range of values within 20 percent of the stated numerical value.

The one or more biometric sensor electrodes can be in electrical communication with the printed circuit board. For instance, the wearable computing device can include an electrical connector that connects the printed circuit board to the one or more electrical contacts disposed on the bottom surface of the cover. In this manner, the electrical connector can provide an electrical path between the printed circuit board and the one or more biometric sensor electrodes.

In some implementations, the electrical connector can include a flexible printed circuit. The flexible printed circuit can include a base portion and a tail portion that is flexible relative to the base portion. In some implementations, the base portion can contact (e.g., touch) the one or more contacts on the bottom surface of the cover. Furthermore, the tail portion can contact the printed circuit board. In this manner, the flexible printed circuit can provide an electrical path between the printed circuit board and the one or more biometric sensor electrodes. It should be understood, however, that the flexible circuit can be connected to the one or more contacts on the bottom surface of the cover through any suitable type of bonding material (e.g., anisotropic conductive film).

The flexible printed circuit can include a flat radio frequency transmission line for each of the one or more biometric sensor electrodes. The flat radio frequency transmission line can extend along both the base portion of the flexible printed circuit as well as the tail portion of the flexible printed circuit. The tail portion can further include one or more control lines for circuitry associated with antenna functionality of the one or more biometric sensor electrodes. Furthermore, the base portion can include one or more tuning circuits, one or more matching circuits, or any other suitable circuitry or components associated with processing radio frequency signals.

The flexible printed circuit can, in some implementations, include multiple layers. For instance, the flexible printed circuit can include a first layer (e.g., outer layer), a second layer (e.g., intermediate layer), and a third layer (e.g., inner layer). The first layer can be positioned closest to the one or more contacts on the bottom surface of the cover. Furthermore, the first layer of the flexible printed circuit can, in some instances, act as a RF ground plane for the one or more biometric sensor electrodes.

In some implementations, the housing of the wearable computing device can include a conductive material (e.g., metal). In such implementations, the wearable computing device can include one or more dielectric spacers positioned between the housing and the one or more biometric sensor electrodes. For instance, a thickness of the one or more dielectric spacers can range from about 0.5 millimeters to about 3 millimeters. In this manner, electromagnetic coupling between the housing and the one or more biometric sensor electrodes can be reduced or controlled.

A wearable computing device according to example aspects of the present disclosure can provide numerous technical effects and benefits. For instance, incorporating the biometric sensor electrodes into the cover (e.g., glass) for the display screen eliminates the need for an element (e.g., bezel) to cover the dead band of the display screen. Additionally, the biometric sensor electrodes can allow for on-demand measurement of biometrics (e.g. electrocardiogram, electrodermal activity, etc.) of the user wearing the wearable computing device. Furthermore, the one or more biometric sensor electrodes can also function as antennas over a range of frequencies (e.g., about 0.6 GHz to about 10 GHZ). In this manner, a total number of components for the wearable computing device can be reduced since the biometric sensor electrodes can act as antennas for communication of information.

Figure 2:
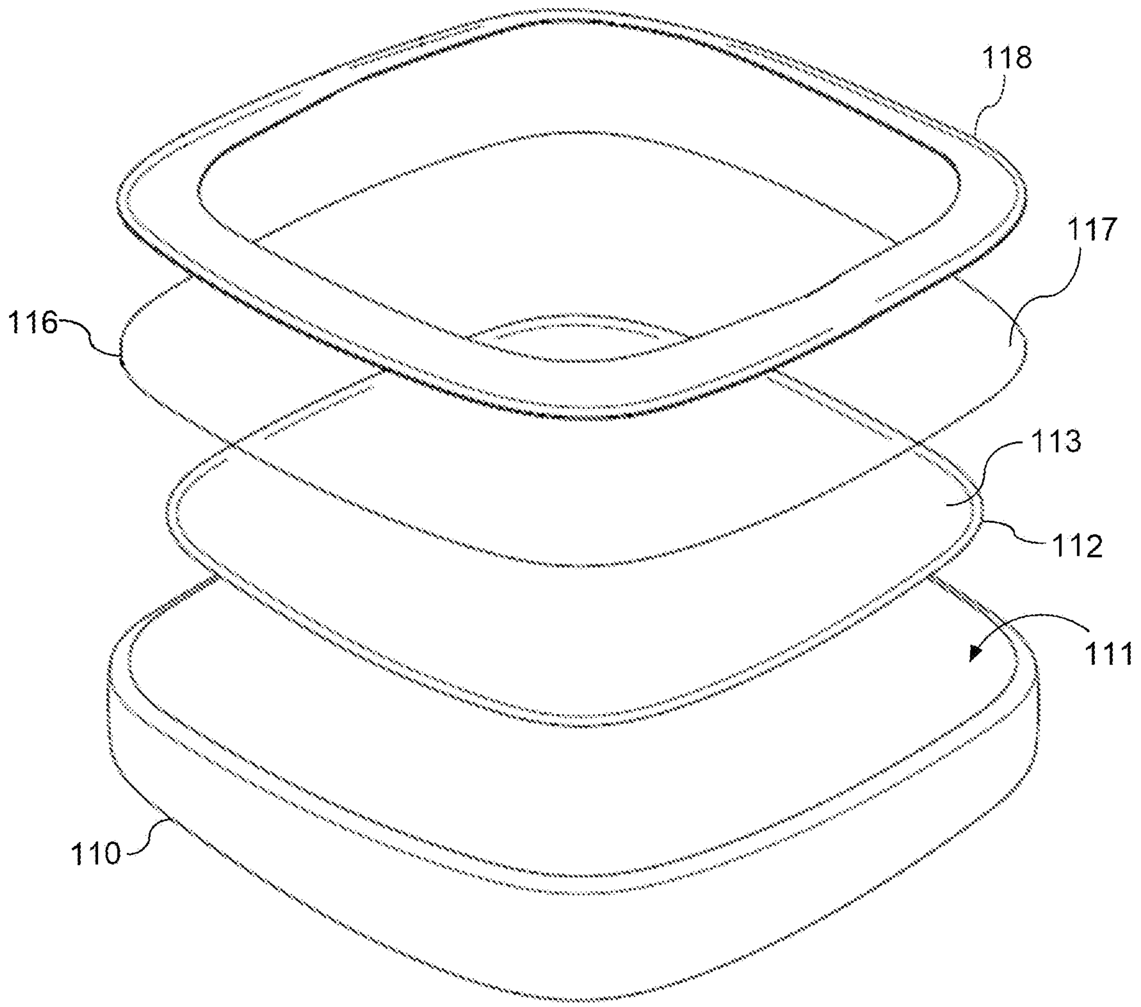
FIG. 2 depicts an exploded view of a wearable computing device according to some implementations of the present disclosure.

Referring now to the FIGS., FIGS. 1 and 2 depict a wearable computing device 100 according to some implementations of the present disclosure. As shown, the wearable computing device 100 can be worn, for instance, on an arm 102 (e.g., wrist) of a user. For instance, the wearable computing device 100 can include a band 104 and a housing 110. In some implementations, the housing 110 can include a conductive material (e.g., metal). In alternative implementations, the housing 110 can include a non-conductive material (e.g., a plastic material, a ceramic material).

The housing 110 can be coupled to the band 104. In this manner, the band 104 can be fastened to the arm 102 of the user to secure the housing 110 to the arm 102 of the user. Furthermore, the housing 110 can define a cavity 111 for one or more electronic components (e.g., disposed on printed circuit boards) of the wearable computing device 100.

The wearable computing device 100 can include a display screen 112. The display screen 112 can display content (e.g., time, date, biometrics, etc.) for viewing by the user. In some implementations, the display screen 112 can include an interactive display screen (e.g., touchscreen or touch-free screen). In such implementations, the user can interact with the wearable computing device 100 via the display screen 112 to control operation of the wearable computing device 100.

In some implementations, the wearable computing device 100 can include one or more input devices 114 that can be manipulated (e.g., pressed) by the user to interact with the wearable computing device 100. For instance, the one or more input devices 114 can include a mechanical button that can be manipulated (e.g., pressed) to interact with the wearable computing device 100. In some implementations, the one or more input devices 114 can be manipulated to control operation of a backlight (not shown) associated with the display screen 112. It should be understood that the one or more input device 114 can be configured to allow the user to interact with the wearable computing device 100 in any suitable manner. For instance, in some implementations, the one or more input devices 114 can be manipulated by the user to navigate through content (e.g., one or more menu screens) displayed on the display screen 112.

The wearable computing device 100 can include a cover 116 positioned on the housing 110 so that the cover 116 is positioned on top of the display screen 112. In this manner, the cover 116 can protect the display screen 112 from being scratched. In some implementations, the wearable computing device 100 can include a seal (not shown) positioned between the cover 116 and the housing 110. For instance, a first surface of the seal can contact the cover 116 and a second surface of the seal can contact the housing 110. In this manner, the seal between the housing 110 and the cover 116 can prevent a liquid (e.g., water) from entering the cavity 111 of the housing 110.

The cover 116 can be optically transparent so that the user can view information being displayed on the display screen 112. For instance, in some implementations, the cover 116 can include a glass material. It should be understood, however, that the cover 116 can include any suitable optically transparent material.

The cover 116 can be sized to cover (e.g., overlay) a top surface 113 of the display screen 112. Furthermore, the wearable computing device 100 can include one or more biometric sensor electrodes 118 (only one shown) at least partially positioned on a portion of a top surface 117 of the cover 116. More particularly, the portion of the top surface 117 can include an outermost portion (e.g., periphery) of the top surface 117. In this manner, the one or more biometric sensor electrodes 118 can eliminate the need for having a separate element, such as a bezel, to frame the display screen 112. Furthermore, since the one or more biometric sensor electrodes 118 are disposed on the top surface 117 of the cover 116, the user can contact (e.g., touch) the one or more biometric sensor electrodes 118 to perform on-demand biometric measurements (e.g., electrocardiogram, electrodermal activity, etc.).

Figure 3:
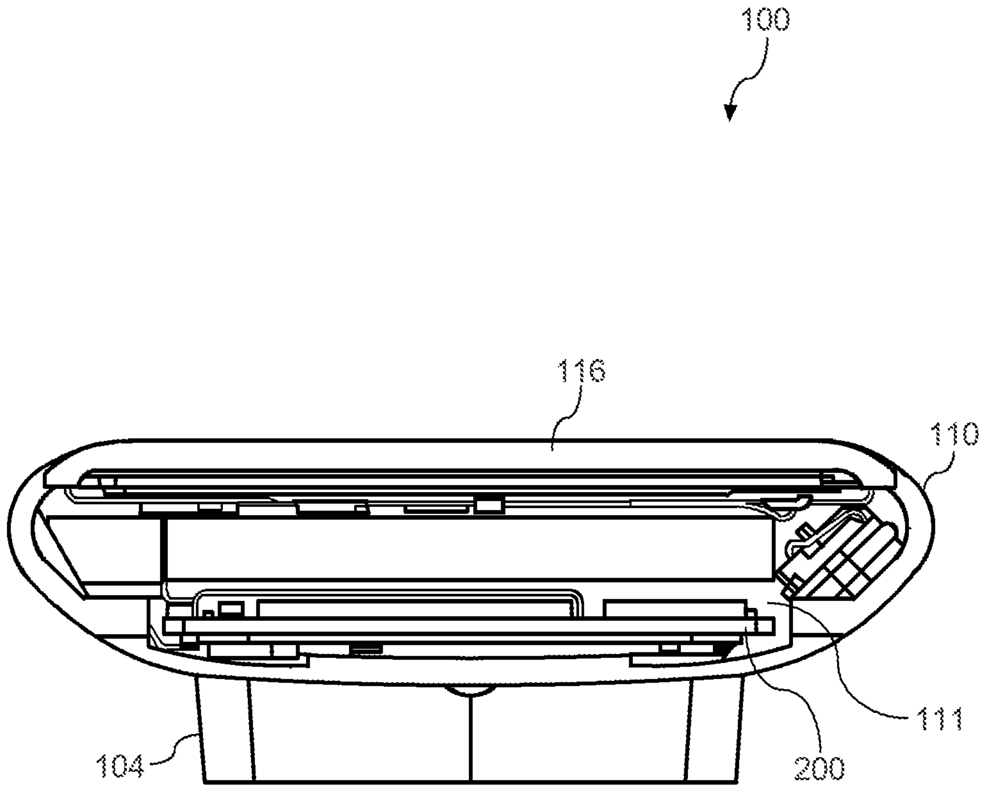
FIG. 3 depicts a cross-sectional view of a wearable computing device according to some implementations of the present disclosure.

Referring now to FIG. 3, a cross-sectional view of the wearable computing device 100 is provided according to some implementations of the present disclosure. As shown, the wearable computing device 100 can include a printed circuit board 200 at least partially positioned within the cavity 111 defined by the housing 110. It should be understood that the display screen 112 (FIG. 2) can, in some implementations, be electrically connected to the printed circuit board 200.

Figure 4:
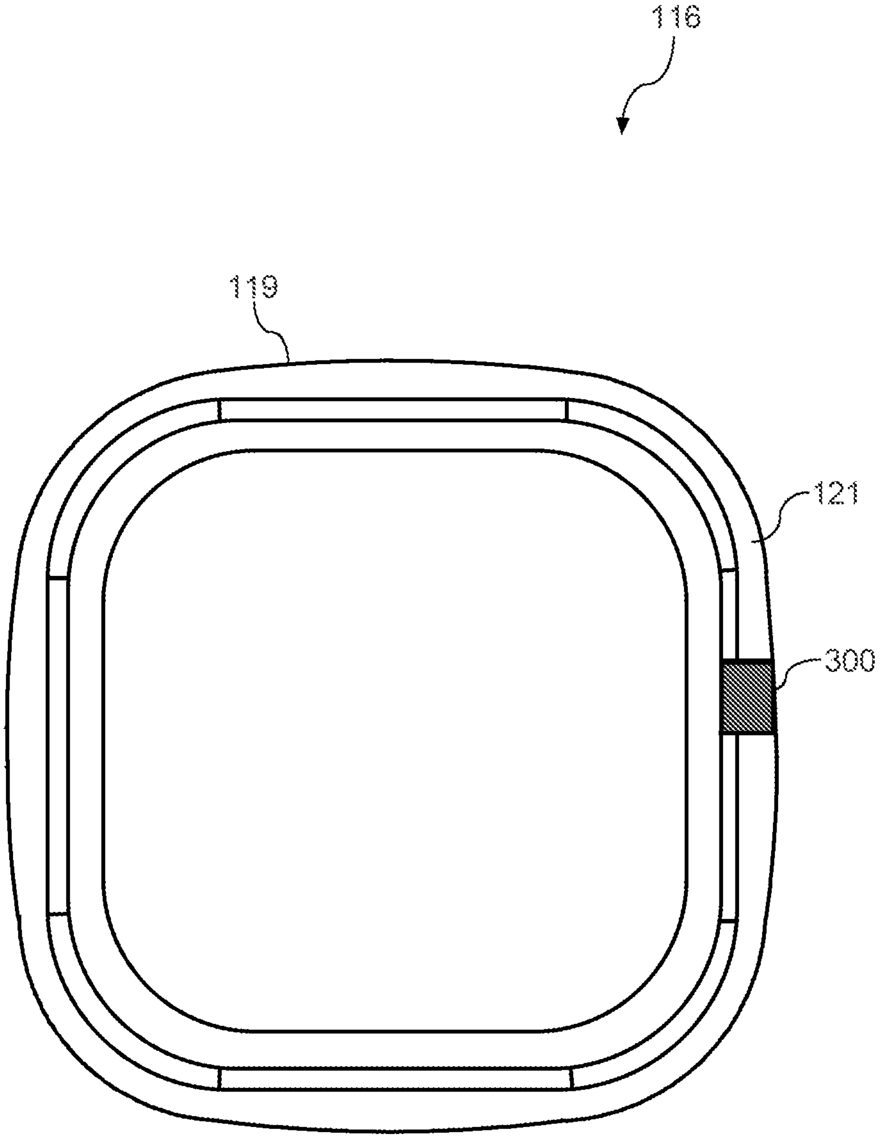
FIG. 4 depicts a bottom view of a cover for a display screen of a wearable computing device according to some implementations of the present disclosure.

Referring now to FIG. 4, a bottom view of the cover 116 for the display screen 112 of the wearable computing device 100 is provided according to some implementations of the present disclosure. As shown, an electrical contact 300 can be disposed on a bottom surface 121 of the cover 116. The one or more biometric sensor electrodes 118 can wrap at least partially around a periphery 119 of the cover 116 to the bottom surface 121 of the cover 116. For instance, the one or more biometric sensor electrodes 118 can wrap at least partially around the periphery 119 of the cover 116 to the bottom surface 121 of the cover 116 such that the one or more biometric sensor electrodes 118 contact (e.g., touch) the electrical contact 300 on the bottom surface 121 of the cover 116.

Figure 5:
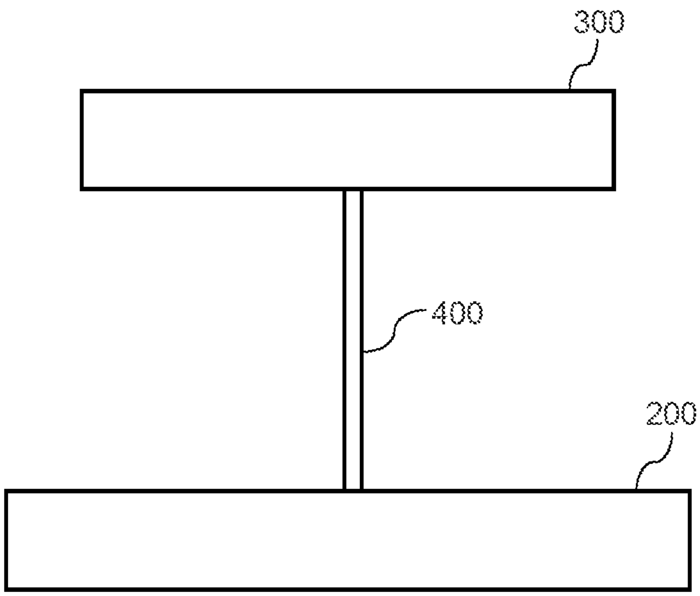
FIG. 5 depicts a schematic of an electrical connection between a printed circuit board of a wearable computing device and an electrical contact on a bottom surface of a cover for a display screen of the wearable computing device according to some implementations of the present disclosure.

Referring now to FIG. 5, an electrical connector 400 can be connected between the printed circuit board 200 and the electrical contact 300 disposed on the bottom surface 121 (FIG. 4) of the cover 116 (FIG. 4) according to some implementations of the present disclosure. In this manner, the electrical connector 400 can provide an electrical path for routing one or more electrical signals between the one or more biometric sensor electrodes 118 and the printed circuit board 200. For instance, in some implementations, the one or more electrical signals can be associated with on-demand biometric measurements of the user taken via the one or more biometric sensor electrodes 118. Alternatively, the one or more electrical signals can be associated with the wearable computing device 100 (FIG. 1) communicating with another device (e.g., smartphone) via the one or more biometric sensor electrodes 118. For instance, the one or more biometric sensor electrodes 118 can function as an antenna configured to communicate (e.g., transmit and/or receive) radio frequency signals over a range of frequencies. In some implementations, the range of frequencies can range from about 0.6 Gigahertz to about 10 Gigahertz. Details of the electrical connector 400 will now be discussed in detail.

Figure 6:
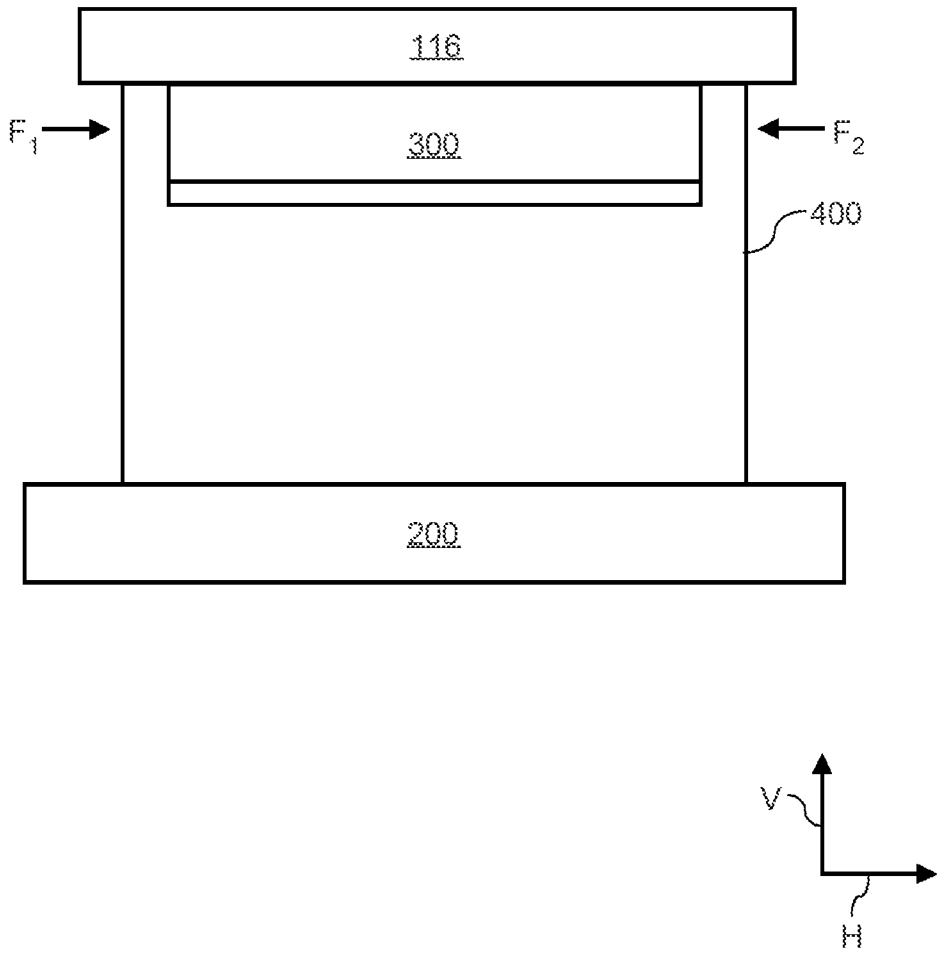
FIG. 6 depicts an electrical connector for electrically connecting a printed circuit board of a wearable computing device to an electrical contact on a bottom surface of a cover for a display screen of the wearable computing device according to some implementations of the present disclosure.

Referring now to FIG. 6, the electrical connector 400 can, in some implementations, contact (e.g., touch) the electrical contact 300 on the bottom surface 121 (FIG. 4) of the cover 116 (FIG. 4) such that the electrical connector 400 eliminates or reduces a force applied on the cover 166 along a vertical direction V associated with the wearable computing device 100) (FIG. 1). For instance, the electrical connector 400 can contact the electrical contact 300 such that the electrical connector 400 surrounds the electrical contact 300 such that the electrical connector 400 applies opposing forces $F_1$ and $F_2$ along a horizontal direction H that is substantially perpendicular (e.g., within about 15 degrees of perpendicular, within about 10 degrees of perpendicular, within about 5 degrees of perpendicular, within about 1 degree of perpendicular) to the vertical direction V. In this manner, the electrical connector 400 can contact the electrical contact 300 in a manner that reduces or eliminates a likelihood of damaging (e.g., causing a leak) the seal (not shown) positioned between the cover 116 and the housing 110.

Figure 7:
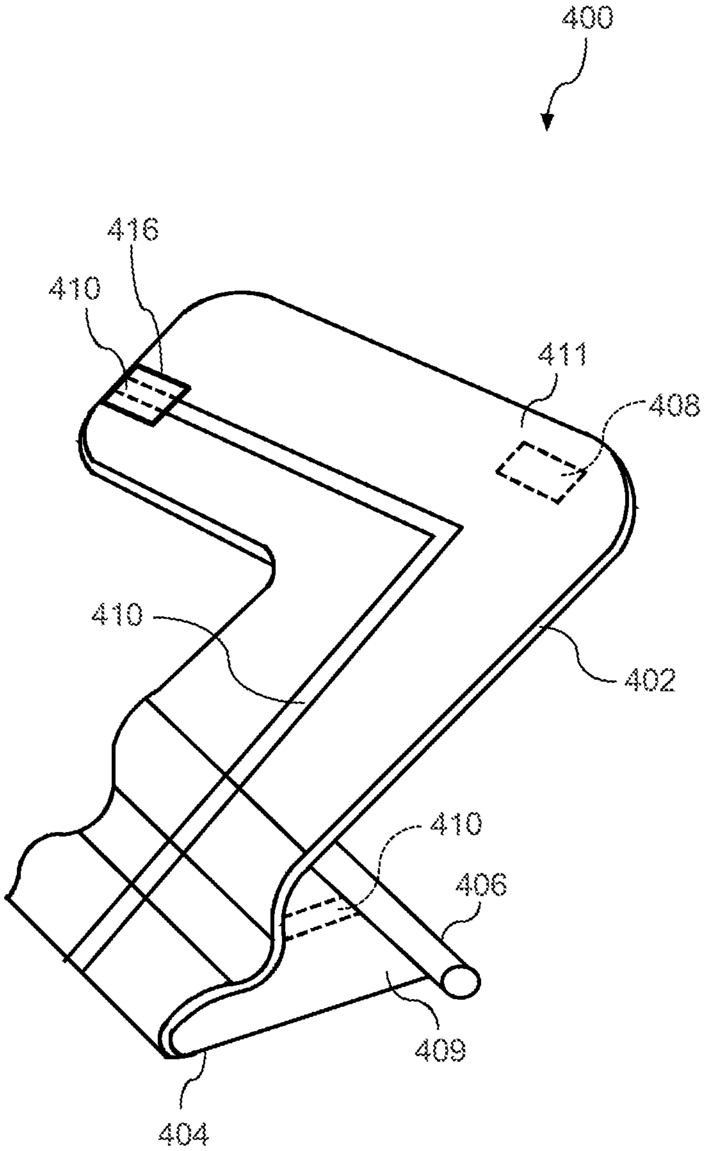
FIG. 7 depicts an electrical connector for electrically connecting a printed circuit board of a wearable computing device to an electrical contact on a bottom surface of a cover for a display screen of the wearable computing device according to some implementations of the present disclosure.
Figure 8:
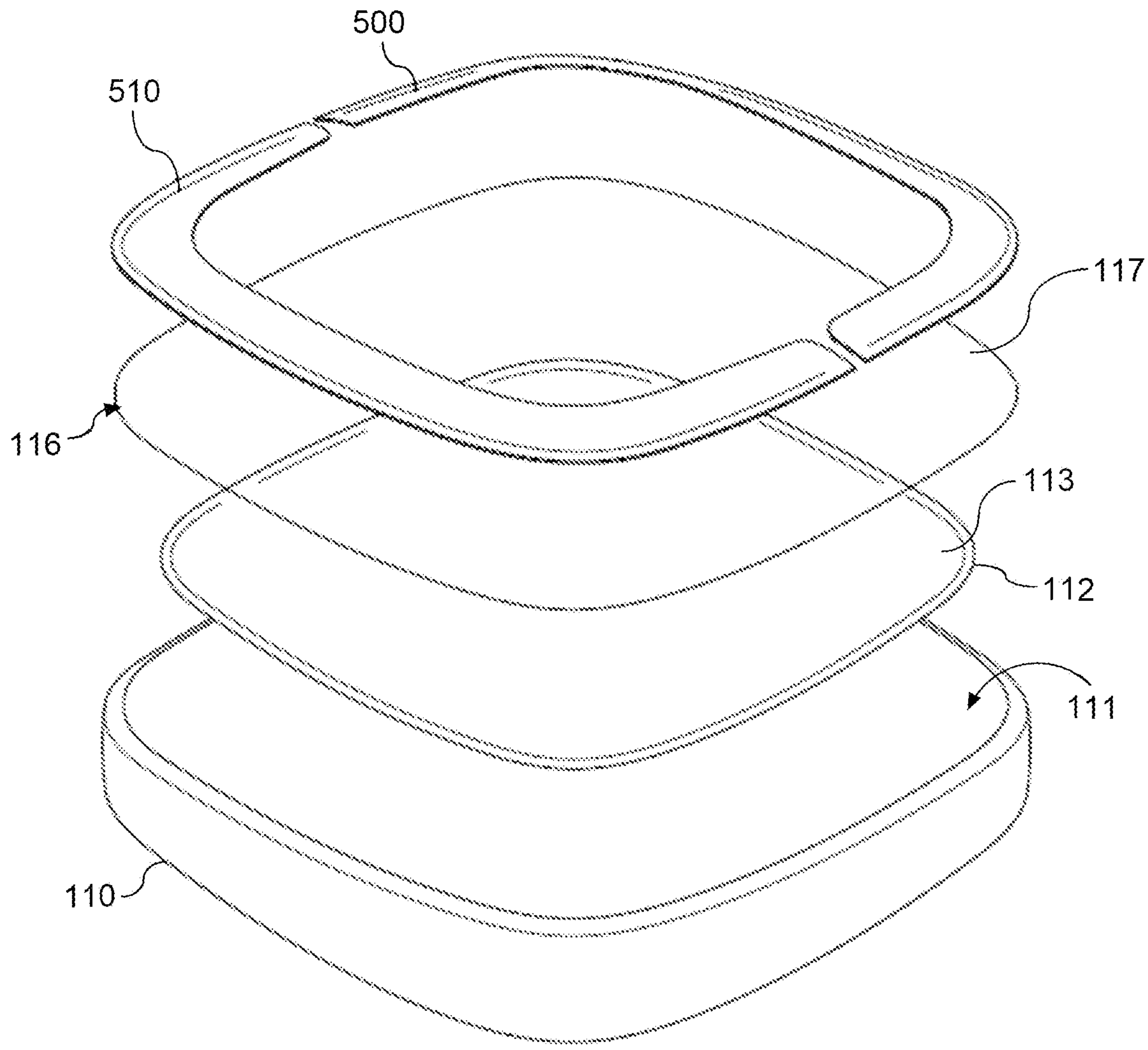
FIG. 8 depicts an exploded view of a portion of a wearable computing device according to some implementations of the present disclosure.
Figure 9:
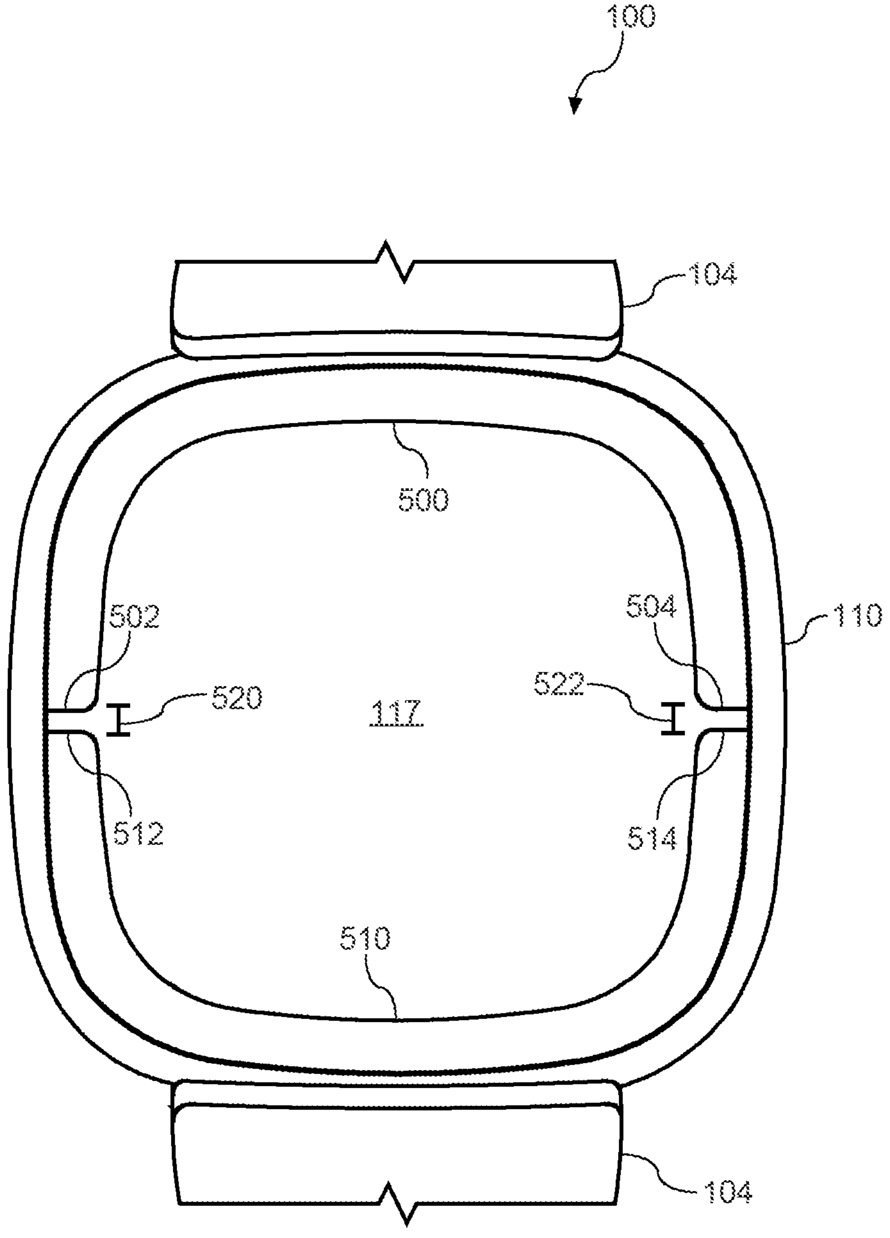
FIG. 9 depicts a top view of a wearable computing device according to some implementations of the present disclosure.
Figure 10:
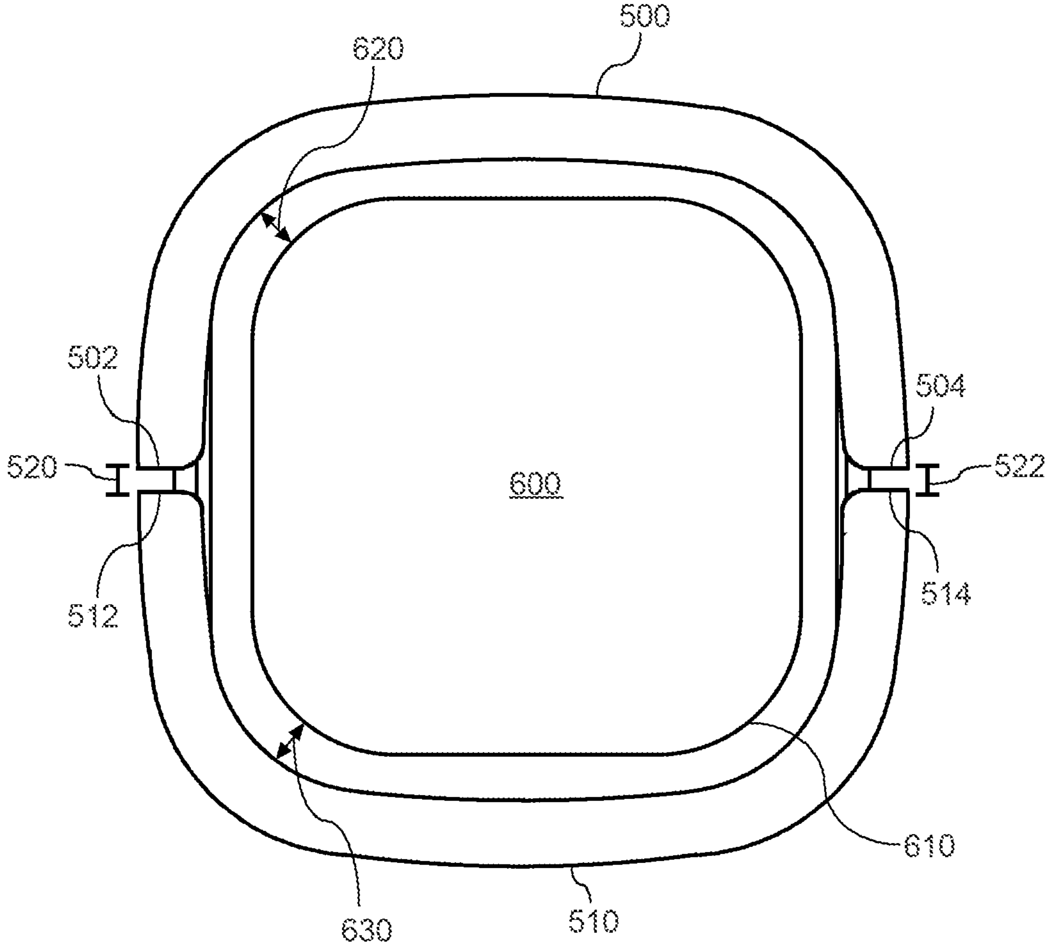
FIG. 10 depicts the top view of FIG. 9 with a cover of the wearable computing device removed according to some implementations of the present disclosure.
Figure 11:
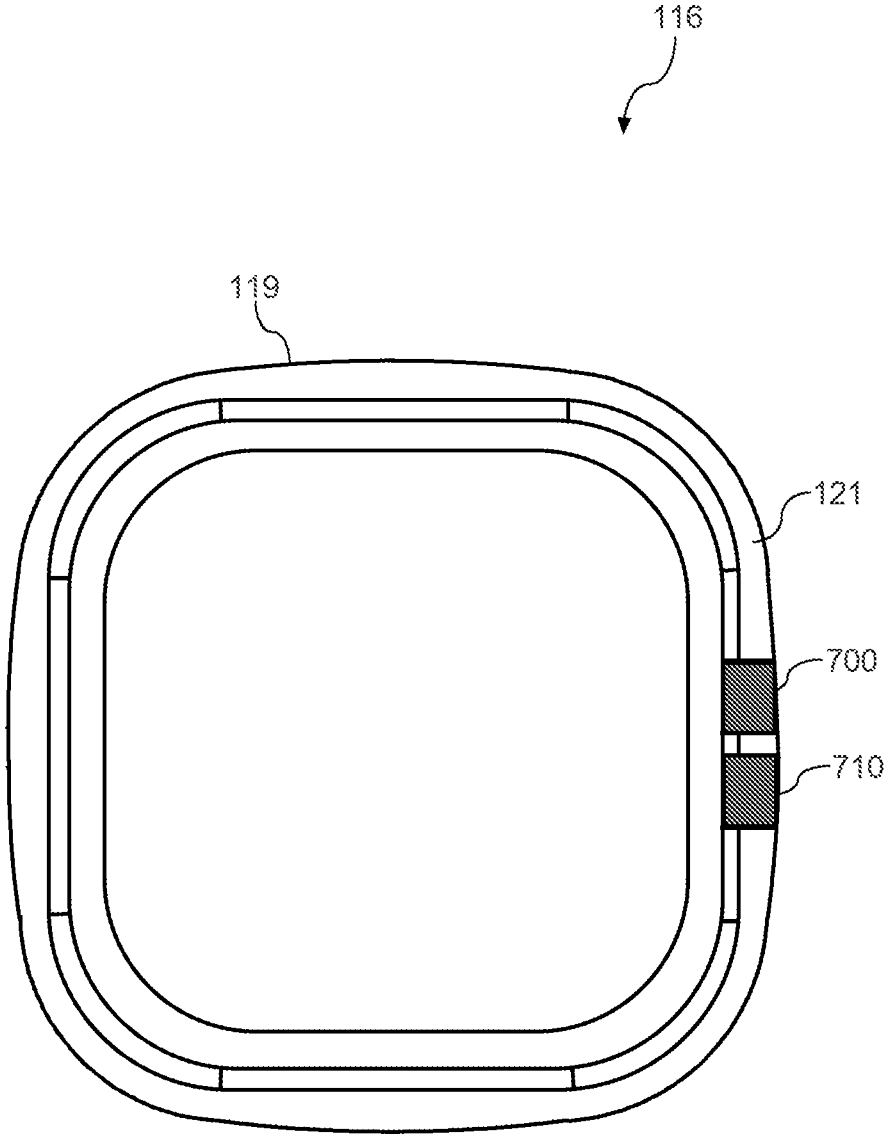
FIG. 11 depicts a bottom view of a cover of a wearable computing device according to some implementations of the present disclosure.

Referring now to FIG. 7, the electrical connector 400 can, in some implementations, be a flexible printed circuit. The electrical connector 400 can include a base portion 402 and a tail portion 404 that extends from the base portion 402 . . . . The tail portion 404 can flex (e.g., bend) relative to the base portion 402. The electrical connector 400 can be connected between the printed circuit board 200 and the electrical contact 300 (FIG. 4) on the bottom surface 121 (FIG. 4) of the cover 116 (FIG. 4). In this manner, the electrical connector 400 can provide an electrical path between the printed circuit board 200 and the one or more biometric sensor electrodes 118. It should be understood, however, that the electrical connector 400 can be connected to the electrical contact 300 on the bottom surface 121 of the cover 116 through any suitable type of bonding material (e.g., anisotropic conductive film).

In some implementations, the tail portion 404 of the electrical connector 400 can include one or more contacts 406 (only one shown). The one or more contacts 406 can facilitate connecting the electrical connector 400 to the printed circuit board 200. In some implementations, the base portion 402 of the electrical connector 400 can include one or more contacts 408 (only one shown) on a first surface 409. The one or more contacts 408 can facilitate grounding the electrical connector to the housing 110. In some implementations, the base portion 402 of the electrical connector 400 can include one or more contacts 416 (only one shown) on a second surface 411 of the electrical connector 400 that is opposite the first surface 409 of the electrical connector 400. The one or more contacts 416 can facilitate connecting the electrical connector 400 to the electrical contact 300 (FIG. 4) on the bottom surface 121 (FIG. 4) of the cover 116 (FIG. 4).

In some implementations, the electrical connector 400 can include a radio frequency transmission line 410 (only one shown) for each of the one or more biometric sensor electrodes 118 (FIG. 1). For instance, the radio frequency transmission line 410 can extend along a second surface 411 of the electrical connector 400 that is opposite the first surface 409 of the electrical connector 400. As shown, a first end of the radio frequency transmission line 410 can be positioned on the base portion 402 of the electrical connector 400 and a second end of the radio frequency transmission line 410 can be positioned on the tail portion 404 of the electrical connector 400. It should be understood that radio frequency signals communicated (e.g., transmitted, received) via the one or more biometric sensor electrodes 118 can be provided to and from the one or more biometric sensor electrodes 118 via the radio frequency transmission line 410.

In some implementations, the radio frequency transmission line 410 can be flat (e.g., a stripline radio frequency transmission line) to reduce or eliminate electromagnetic coupling between an inner conductor of the radio frequency transmission line 410 and other conductive components (e.g., housing 110) of the wearable computing device 100 (FIG. 1). In this manner, degradation of a radio frequency signal travelling along the radio frequency transmission line 410 due, at least in part, to electromagnetic coupling between the inner conductor of the radio frequency transmission line 410 and other conductive components of the wearable computing device 100 can be reduced or eliminated.

In some implementations, the tail portion 404 can include one or more control lines for circuitry associated with antenna functionality of the one or more biometric sensor electrodes 118. The base portion 402 can include one or more tuning circuits, one or more matching circuits, or any other suitable circuitry or components associated with processing radio frequency signals. In this manner, the circuitry onboard the electrical connector 400 can separate electrical signals associated with measuring biometrics (e.g., electrocardiogram, electrodermal activity) and electrical signals (e.g., radio frequency signals) associated with antenna functionality of the one or more biometric sensor electrodes 118. In alternative implementations, the electrical signals associated with measuring biometrics and the electrical signals associated with antenna functionality can be separated by circuitry included on the printed circuit board 200 (FIG. 3).

In some implementations, the electrical connector 400 can include multiple layers. For instance, the electrical connector 400 can include a first layer (e.g., top layer), a second layer (e.g., inner layer), and a third layer (e.g., bottom layer). When the electrical connector 400 is connected between the printed circuit board 200 and the electrical contact 300, the first layer of the electrical connector 400 can be positioned closest to the electrical contact 300. Furthermore, the first layer of the electrical connector 400 can include a copper material. In this manner, the first layer of the electrical connector 400 can act as a radio frequency ground plane for the one or more biometric sensor electrodes 118.

Referring now to FIGS. 8 through 11, the one or more biometric sensor electrodes 118 (FIG. 1) of the wearable computing device 100 can, in some implementations, include a first biometric sensor electrode 500 and a second biometric sensor electrode 510. In alternative implementations, the wearable computing device 100 can have more than two biometric sensor electrodes.

As shown, the first biometric sensor electrode 500 and the second biometric sensor electrode 510 can be positioned on the top surface 117 of the cover 116. For instance, the first biometric sensor electrode 500 and the second biometric sensor electrode 510 can each be at least partially positioned on a portion of the top surface 117 of the cover 116. More particularly, the portion of the top surface 117 can include an outermost portion (e.g., periphery) of the top surface 117. In this manner, the first biometric sensor electrode 500 and the second biometric sensor electrode 510 can eliminate the need for having a separate element, such as a bezel, to frame the display screen 112.

It should be understood that the first biometric sensor electrode 500 and the second biometric sensor electrode 510 can eliminate the need for having a separate element (e.g., a bezel) to frame the display screen 112. For instance, the first biometric sensor electrode 500 and the second biometric sensor electrode 510 can cover at least a portion of an area surrounding an active display area 600 of the display screen 112. For instance, the portion of the area surrounding the active display area 600 can include a dead band of the display screen 112. As used herein, the term “dead band” refers to an area of the top surface 117 of the display screen 112 that extends from an edge 610 of the active display area 600 of the top surface 113 of the display screen 112 to the periphery 119 of the cover 116.

Furthermore, since the first biometric sensor electrode 500 and the second biometric sensor electrode 510 are positioned on the top surface 117 of the cover 116, the first biometric sensor electrode 500 and the second biometric sensor electrode 510 can allow for on-demand measurement of biometrics (e.g. electrocardiogram, electrodermal activity, etc.) of the user wearing the wearable computing device 100. For instance, in some implementations, the user can contact (e.g., touch) the first biometric sensor electrode 500 to obtain an on-demand electrocardiogram reading. Alternatively, or additionally, the user can contact (e.g. touch) both the first biometric sensor electrode 500 and the second biometric sensor electrode 510 to obtain an on-demand electrodermal activity reading.

In some implementations, the first biometric sensor electrode 500 and the second biometric sensor electrode 510 can be spaced apart from one another on the top surface 117 of the cover 116. For instance, a first gap 520 can be defined between a first end 502 of the first biometric sensor electrode 500 and a first end 512 of the second biometric sensor electrode 510. Additionally, a second gap 522 can be defined between a second end 504 of the first biometric sensor electrode 500 and a second end 514 of the second biometric sensor electrode 510. In some implementations, a width of the first gap 520 and a width of the second gap 522 can be the same. In alternative implementations, the width of the first gap 520 can be different (e.g., narrower, wider) than the width of the second gap 522. For instance, in some implementations, the width of the first gap 520 and the width of the second gap 522 can range from about 0.5 mm to about 2 mm.

The first biometric sensor electrode 500 and the second biometric sensor electrode 510 can wrap around the periphery 119 of the cover 116 to contact (e.g., touch) one or more electrical contacts on a bottom surface 121 of the cover 116. For instance, in some implementations, the bottom surface 121 of the cover 116 can include a first electrical contact 700 and a second electrical contact 710. In such implementations, the first biometric sensor electrode 500 can wrap around a first portion of the periphery 119 of the cover 116 to contact the first electrical contact 700 on the bottom surface 121 of the cover 116. Furthermore, the second biometric sensor electrode 510 can wrap around a second portion of the periphery 119 of the cover 116 to contact the second electrical contact 710 on the bottom surface 121 of the cover 116. It should be understood that the second portion of the periphery 119 of the cover 116 is different than the first portion of the periphery 119 of the cover 116. For instance, in some implementations, the first portion of the periphery 119 can correspond to an upper half of the cover 116. Furthermore, in such implementations, the second portion of the periphery 119 can correspond to a lower half of the cover 116. It should also be understood that, in some implementations, the bottom surface 121 of the cover 116 can include more electrical contacts. For instance, in some implementations, the bottom surface 121 of the cover 116 can include multiple electrical contacts to which the first biometric sensor electrode 500 can be connected. Alternatively, or additionally, the bottom surface 121 of the cover 116 can include multiple electrical contacts to which the second biometric sensor electrode 510 can be connected.

In some implementations, the top surface 117 of the cover 116 and the bottom surface 121 of the cover 116 can each be flat. Alternatively, or additionally, the periphery 119 of the cover 116 can be curved. It should be understood, however, that the cover 116 can have any suitable shape. It should also be understood that, in some implementations, the first biometric sensor electrode 500 and the second biometric sensor electrode 510 can be electrically coupled to the printed circuit board 200 via the electrical connector 400 (FIG. 5). For instance, in some implementations, the electrical connector 400 can be connected between the printed circuit board 200 and the one or more electrical contact (e.g., first electrical contact 700, second electrical contact 710) on the bottom surface 121 of the cover 116. In this manner, signals associated with biometric measurements can be communicated to one or more circuits on the printed circuit board 200 via the electrical connector 400.

The first biometric sensor electrode 500, the second biometric sensor electrode 510, or both can be operable as a radio frequency antenna. For instance, at least a portion of at least one of the first biometric sensor electrode 500 or the second biometric sensor electrode 510 can include a conductive material capable of carrying radio frequency currents. In this manner, at least one of the first biometric sensor electrode 500 or the second biometric sensor electrode 510 can operate as a radio frequency antenna. It should be understood that the conductive material can include any suitable conductive material capable of transmitting radio frequency currents. For instance, in some implementations, the conductive material can include a silver material. Furthermore, in some implementations, the silver material can have a thickness ranging from about 20 micrometers to about 40 micrometers.

In some implementations, a portion of at least one of the first biometric sensor electrode 500 or the second biometric sensor electrode 510 that is positioned on the top surface 117 of the cover 116 can include the conductive material. Alternatively, or additionally, a portion of at least one of the first biometric sensor electrode 500 or the second biometric sensor electrode 510 that is positioned on the bottom surface 121 of the cover 116 can include the conductive material. It should be understood that any portion of at least one of the first biometric sensor electrode 500 or the second biometric sensor electrode 510 can include the conductive material.

In some implementations, at least a portion of the first biometric sensor electrode 500 can include a first conductive material to facilitate transmission of one or more first radio frequency currents. In this manner, the first biometric sensor electrode 500 can be operable as a first radio frequency antenna. Additionally, at least a portion of the second biometric sensor electrode 510 can include a second conductive material to facilitate transmission of one or more second radio frequency currents. In this manner, the second biometric sensor electrode 510 can be operable as a second radio frequency antenna.

In some implementations, the first conductive material and the second conductive material can be different from one another. In alternative implementations, the first conductive material and the second conductive material can be the same. For instance, in some implementations, the first conductive material and the second conductive material can include a silver material.

Referring now to FIGS. 12A, 12B, 13A, 13B, 14A, and 14B, a first physical vapor deposition (PVD) defined coating 530) can cover at least a portion of the first biometric sensor electrode 500. For instance, the first PVD defined coating 530 can cover at least the portion of the first biometric sensor electrode 500 that includes the first conductive material. Alternatively, or additionally, a second physical vapor deposition (PVD) defined coating 540) that is separate from the first PVD defined coating 530 can cover at least a portion of the second biometric sensor electrode 510. For instance, the second PVD defined coating 540) can cover at least the portion of the second biometric sensor electrode 510 that includes the second conductive material.

It should be understood that the first PVD defined coating 530 covering the portion of the first biometric sensor electrode 500 that includes the first conductive material can have sheet resistance such that the first PVD defined coating 530 is at least partially radio frequency transparent for a range of frequencies (e.g., about 0.6 Gigahertz to about 10 Gigahertz) at which the first biometric sensor electrode 500 is operable as the first radio frequency antenna. For instance, in some implementations, the sheet resistance of the first PVD defined coating 530 can be greater than 200 ohms per square. Alternatively, or additionally, a radio frequency transparency of the first PVD defined coating 530 can be at least 80% (e.g., a transmission coefficient of at least 0.8) for the range of frequencies. In alternative implementations, the first PVD defined coating 530 can be even more radio frequency transparent. For instance, in some implementations, the radio frequency transparency of the first PVD defined coating 530 can be at least 90% (e.g., a transmission coefficient of about at least 0.90) for the range of frequencies.

It should also be understood that the second PVD defined coating 540 covering the portion of the second biometric sensor electrode 510 that includes the second conductive material can have a sheet resistance such that the second PVD defined coating 540 is at least partially radio frequency transparent for a range of frequencies (e.g., about 0.6 Gigahertz to about 10 Gigahertz) at which the second biometric sensor electrode 510 is operable as the second radio frequency antenna. For instance, in some implementations, the sheet resistance of the second PVD defined coating 540 can be greater than 200 ohms per square. Alternatively, or additionally, a radio frequency transparency of the second PVD defined coating 540) can be at least 80% (e.g., a transmission coefficient of at least 0.8) for the range of frequencies. In alternative implementations, the second PVD defined coating 540 can be even more radio frequency transparent. For instance, in some implementations, the radio frequency transparency of the second PVD defined coating 540 can be at least 90% (e.g., a transmission coefficient of about at least 0.90) for the range of frequencies.

Figure 12A:
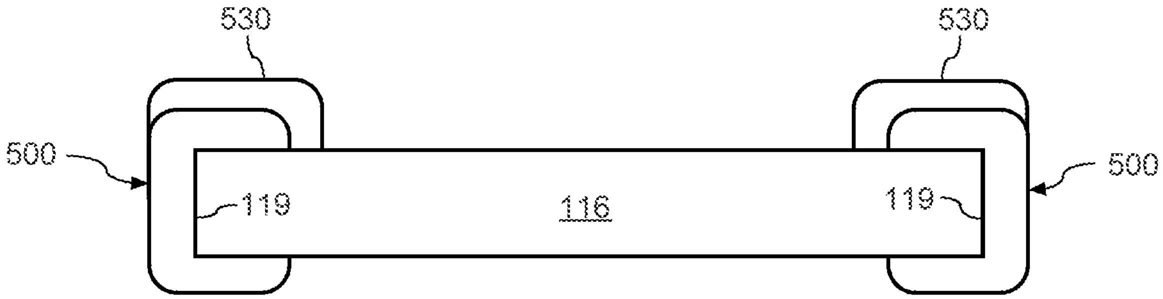
FIG. 12A depicts a first physical vapor deposition defined coating covering a portion of a first biometric sensor electrode that is positioned on a top surface of a cover for a display screen of a wearable computing device according to some implementations of the present disclosure.
Figure 12B:
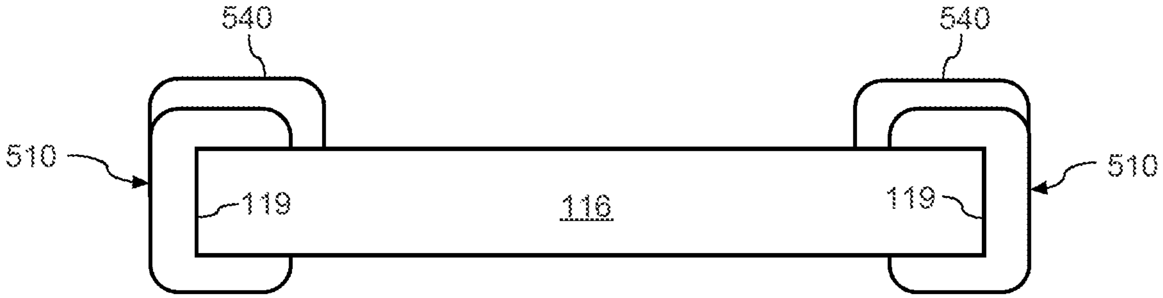
FIG. 12B depicts a second physical vapor deposition defined coating covering a portion of a second biometric sensor electrode that is positioned on a top surface of a cover for a display screen of a wearable computing device according to some implementations of the present disclosure.
Figure 13A:
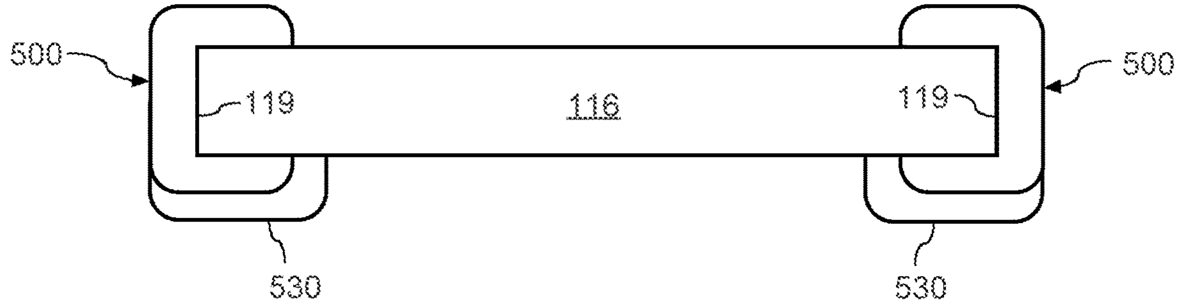
FIG. 13A depicts a first physical vapor deposition defined coating covering a portion of a first biometric sensor electrode that is positioned on a bottom surface of a cover for a display screen of a wearable computing device according to some implementations of the present disclosure.
Figure 13B:
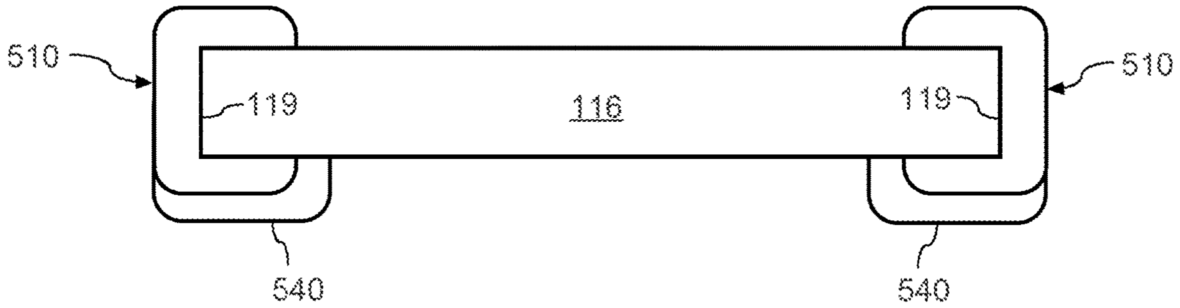
FIG. 13B depicts a second physical vapor deposition defined coating on a portion of a second biometric sensor electrode that is positioned on a bottom surface of a cover for a display screen of a wearable computing device according to some implementations of the present disclosure.

In some implementations, the first PVD defined coating 530 can cover at least a portion of the first biometric sensor electrode 500 that is positioned on the top surface 117 of the cover 116 as shown in FIG. 12A. Alternatively, or additionally, the second PVD defined coating 540) can cover at least a portion of the second biometric sensor electrode 510 that is positioned on the top surface 117 of the cover 116. In some implementations, the first PVD defined coating 530) can cover at least a portion of the first biometric sensor electrode 500) that is disposed on the bottom surface 121 of the cover 116 as shown in FIG. 13A. Alternatively, or additionally, the second PVD defined coating 540) can cover at least a portion of the second biometric sensor electrode 510 that is disposed on the bottom surface 121 of the cover 116 as shown in FIG. 13B.

It should be understood that the first PVD defined coating 530 can cover any portion of the first biometric sensor electrode 500. For instance, in some implementations, the first PVD defined coating 530 can completely cover the first biometric sensor electrode 500. It should also be understood that the second PVD defined coating 540 can cover any portion of the second biometric sensor electrode 510. For instance, in some implementations, the second PVD defined coating 540) can completely cover the second biometric sensor electrode 510.

Figure 14A:
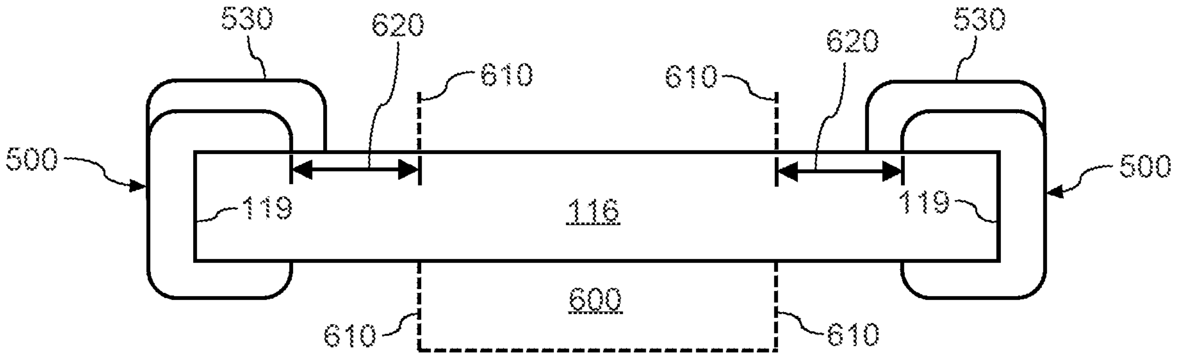
FIG. 14A depicts a first gap defined between an active display area of a display screen of a wearable computing device and a portion of a first biometric sensor electrode positioned on a top surface of a cover for the display screen according to some implementations of the present disclosure.

In some implementations, a first gap 620 can be defined between the edge 610 of the active display area 600 and the first biometric sensor electrode 500 as shown in FIG. 14A. For instance, in some implementations, a width of the first gap 620 can be greater than 1 millimeter to reduce or control electromagnetic coupling of the display screen 112 to the first conductive material of the first biometric sensor electrode 500. In this manner, degradation of radiation of the first radio frequency antenna (e.g., first biometric sensor electrode 500) due to the electromagnetic coupling of the display screen 112 to the first conductive material of the first biometric sensor electrode 500 can be reduced or controlled.

In some implementations, the first PVD defined coating 530 covering at least a portion of the first biometric sensor electrode 500 can extend inward towards the edge 610 of the active display area 600 of the display screen 112. For instance, the first PVD defined coating 530 can extend inward towards the edge 610 of the active display area 600 as shown in FIG. 14A. In some implementations, the first PVD defined coating 530 can extend inward towards the edge 610 of the active display area 600 such that a width of a gap between the edge 610 of the active display area 600 and the first PVD defined coating 530 is less than one millimeter.

Furthermore, in such implementations, the first PVD defined coating 530 can have a sheet resistance such that the first PVD defined coating 530 is more radio frequency transparent for a range of frequencies (e.g., about 0.6 Gigahertz to about 10 Gigahertz) at which the first biometric sensor electrode 500 is operable as the first radio frequency antenna. In this manner, degradation in performance (e.g., radiation efficiency) of the first radio frequency antenna due to the first PVD defined coating 530 being close (e.g., less than a millimeter) to the edge 610 of the active display area 600 of the display screen 112 can be reduced or eliminated, because the first PVD defined coating 530 is more radio frequency transparent for the range of frequencies at which the first conductive material is capable of carrying the one or more first radio frequency currents.

Figure 14B:
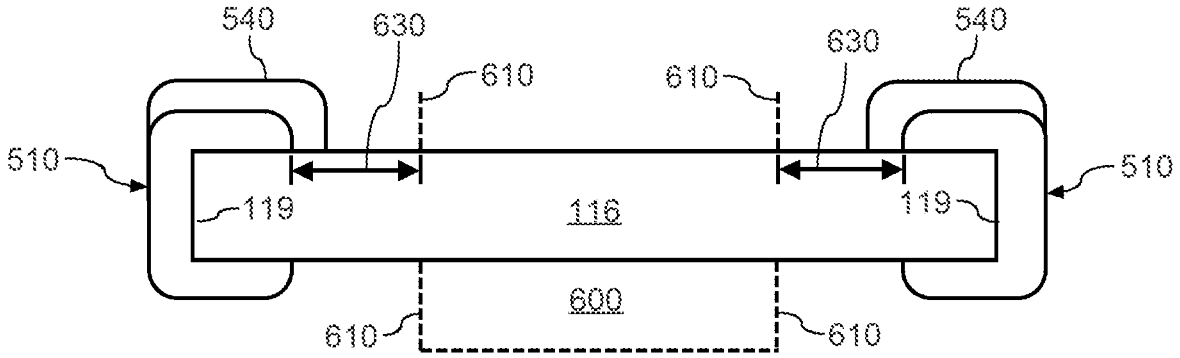
FIG. 14B depicts a second gap defined between an active display area of a display screen of a wearable computing device and a portion of a second biometric sensor electrode positioned on a top surface of a cover for the display screen according to some implementations of the present disclosure.

In some implementations, a second gap 630 can be defined between the edge 610 of the active display area 600 and the second biometric sensor electrode 510 as shown in FIG. 14B. For instance, in some implementations, a width of the second gap 630 can be greater than 1 millimeter to reduce or control electromagnetic coupling of the display screen 112 to the second conductive material of the second biometric sensor electrode 510. In this manner, degradation of radiation of the second radio frequency antenna (e.g., second biometric sensor electrode 510) due to the electromagnetic coupling of the display screen 112 to the second conductive material of the second biometric sensor electrode 510 can be reduced or controlled.

In some implementations, a width of the second gap 630 defined between the edge 610 of the active display area 600 and the second biometric sensor electrode 510 can be different (e.g., wider, narrower) than a width of the first gap 620 defined between the edge 610 of the active display area 600 and the first biometric sensor electrode 500. In alternative implementations, the width of the second gap 630 can be the same as the width of the first gap 620.

In some implementations, the second PVD defined coating 540 covering at least a portion of the second biometric sensor electrode 510 can extend inward towards the edge 610 of the active display area 600 of the display screen 112. For instance, the second PVD defined coating 540 can extend inward towards the edge 610 of the active display area 600 as shown in FIG. 14B. In some implementations, the second PVD defined coating 540) can extend inward towards the edge 610 of the active display area 600 such that a width of a gap between the edge 610 of the active display area 600 and the second PVD defined coating 540) is less than one millimeter.

Furthermore, in such implementations, the second PVD defined coating 540) can have a sheet resistance such that the second PVD defined coating 540 is more radio frequency transparent for a range of frequencies (e.g., about 0.6 Gigahertz to about 10 Gigahertz) at which the second biometric sensor electrode 510 is operable as the second radio frequency antenna. In this manner, degradation in performance (e.g., radiation efficiency) of the second radio frequency antenna due to the second PVD defined coating 540 being close (e.g., less than a millimeter) to the edge 610 of the active display area 600 of the display screen 112 can be reduced or eliminated, because the second PVD defined coating 540 is radio frequency transparent for the range of frequencies at which the second conductive material is capable of carrying the one or more second radio frequency currents.

Figure 15:
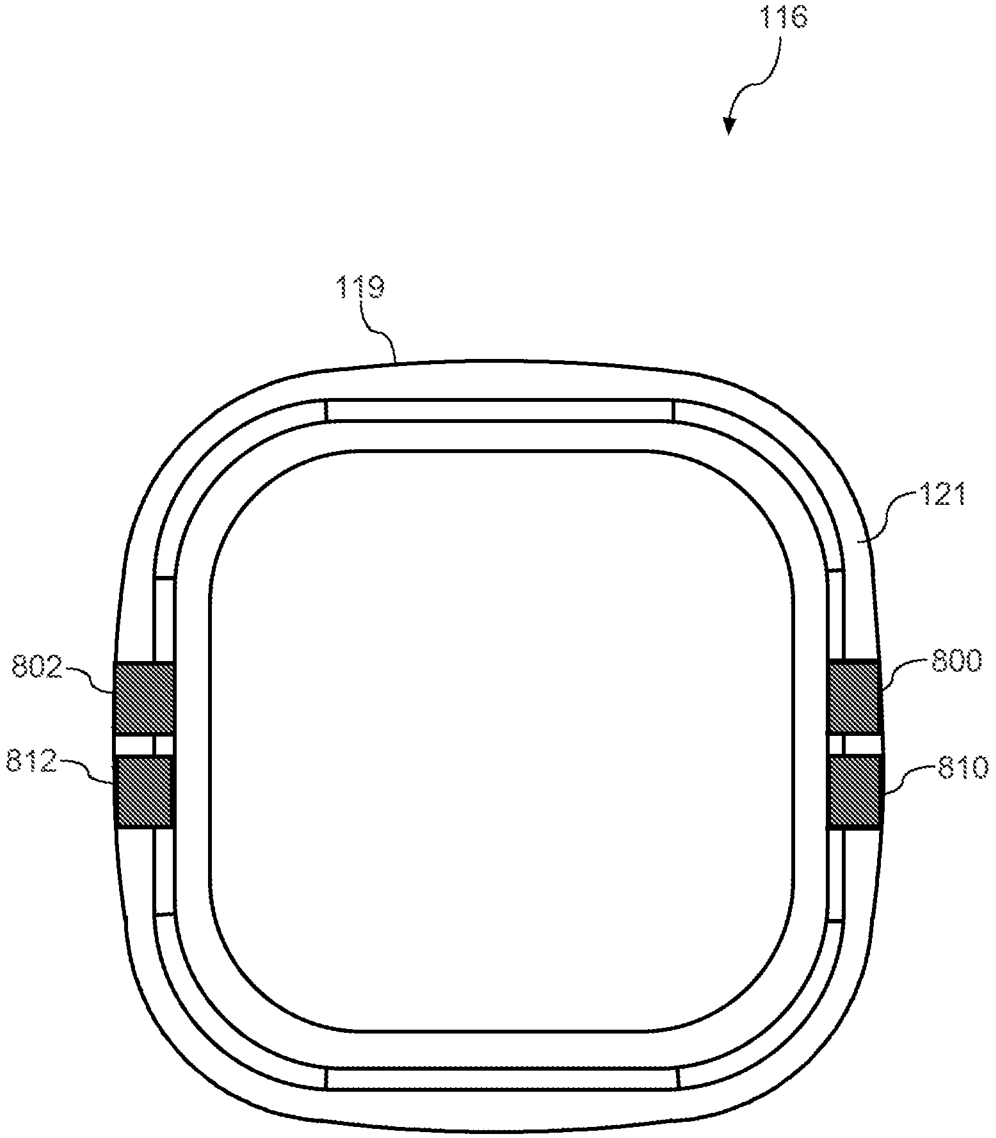
FIG. 15 depicts a bottom view of a cover for a display screen of a wearable computing device according to some implementations of the present disclosure.

Referring now to FIG. 15, multiple electrical connectors can be used for at least one of the first biometric sensor electrode 500 or the second biometric sensor electrode 510. For instance, a first electrical connector (e.g., electrical connector 400 of FIG. 4) can be connected between the printed circuit board 200 and a first electrical contact 800 for the first biometric sensor electrode 500. Additionally, a second electrical connector (e.g., electrical connector 400 of FIG. 4) can be connected between the printed circuit board 200 and a second electrical contact 802 for the first biometric sensor electrode 500. In this manner, aperture tuning can be implemented on the first biometric sensor electrode 500 when operating as the radio frequency antenna. For instance, the first biometric sensor electrode 500 can be connected to a radio on the printed circuit board 200 (FIG. 2) via the first electrical connector. Furthermore, the first biometric sensor electrode 500 can be connected to an aperture tuning circuit on the printed circuit board 200 via the second electrical connector. More particularly, resonances of the first biometric sensor electrode 500 can be adjusted to allow the first biometric sensor electrode 500 to operate over a wider frequency range or additional frequency bands.

Furthermore, in some implementations, a third electrical connector (e.g., electrical connector 400 of FIG. 4) can be connected between the printed circuit board 200 and a third electrical contact 810 for the second biometric sensor electrode 510. Additionally, a fourth electrical connector (e.g., electrical connector 400 of FIG. 4) can be connected between the printed circuit board 200 and a fourth electrical contact 812 for the second biometric sensor electrode 510. In this manner, aperture tuning can be implemented on the second biometric sensor electrode 510 when operating as the radio frequency antenna. For instance, the second biometric sensor electrode 510 can be connected to a radio on the printed circuit board 200 (FIG. 2) via the third electrical connector. Furthermore, the second biometric sensor electrode 510 can be connected to an aperture tuning circuit on the printed circuit board 200 via the fourth electrical connector. More particularly, resonances of the second biometric sensor electrode 510 can be adjusted to allow the second biometric sensor electrode 510 to operate over a wider frequency range or additional frequency bands.

Figure 16:
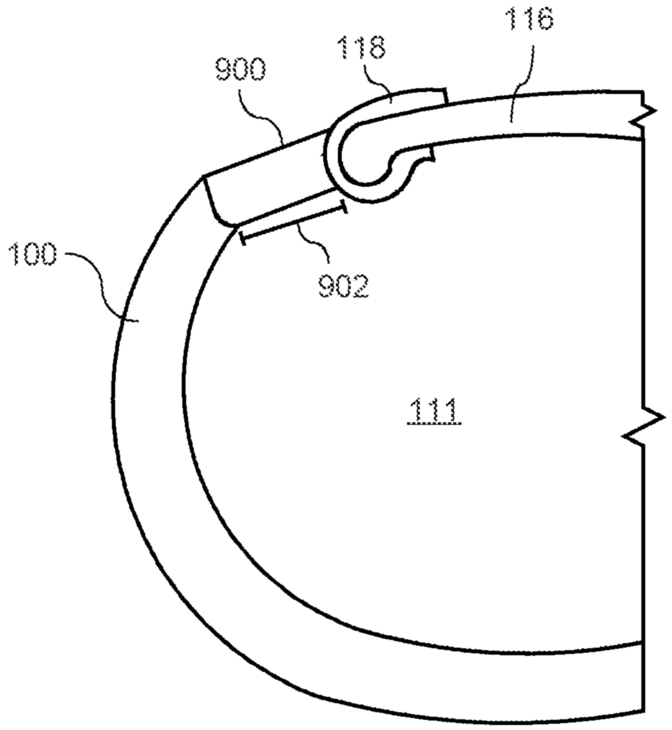
FIG. 16 depicts a cross-sectional view of a portion of a wearable computing device according to some implementations of the present disclosure.

Referring now to FIG. 16, a cross-sectional view of a portion of the wearable computing device 100 (FIG. 3) is provided according to some implementations of the present disclosure. The housing 110 of the wearable computing device 100 can, in some implementations, include a conductive material (e.g., material). In such implementations, the wearable computing device 100 can include one or more dielectric spacers 900 (only one shown) positioned between the housing 110 and the periphery 119 of the cover 116. In this manner, the one or more dielectric spacers 900 can reduce or control electromagnetic coupling between the housing 110 (e.g., metal) and the one or more biometric sensor electrodes 118 that at least partially wrap around the periphery 119 of the cover 116. In some implementations, a width 902 of the one or more dielectric spacers 900 can range from about 0.5 millimeters to about 3 millimeters to provide spacing needed to reduce or control the electromagnetic coupling between the housing 110 and the one or more biometric sensor electrodes 118.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A wearable computing device comprising:
- a housing;
- a printed circuit board at least partially disposed within the housing;
- a display screen electrically coupled to the printed circuit board;
- a cover positioned on the display screen, the cover comprising a top surface and a bottom surface, the bottom surface comprising one or more electrical contacts electrically connected to the printed circuit board; and
- a biometric sensor electrode positioned on the top surface of the cover, the biometric sensor electrode wrapping at least partially around a periphery of the cover and contacting the one or more electrical contacts on the bottom surface of the cover, the biometric sensor electrode having one or more portions that include a conductive material capable of carrying a radio frequency current such that the biometric sensor electrode is operable as a radio frequency antenna.

2. The wearable computing device of claim 1, further comprising:
- one or more electrical connectors electrically connecting the printed circuit board to the one or more electrical contacts on the bottom surface of the cover.

3. The wearable computing device of claim 2, wherein the one or more electrical connectors comprise a flexible printed circuit having a base portion and a tail portion that is flexible relative to the base portion.

4. The wearable computing device of claim 3, wherein the flexible printed circuit comprises one or more radio frequency transmission lines disposed on the tail portion of the flexible printed circuit and the base portion of the flexible printed circuit.

5. The wearable computing device of claim 1, wherein the housing comprises a conductive housing.

6. The wearable computing device of claim 5, further comprising:
- one or more dielectric spacers positioned between the conductive housing and the biometric sensor electrode.

7. The wearable computing device of claim 1, wherein the cover comprises a glass material.

8. The wearable computing device of claim 1, further comprising:
- a physical vapor deposition defined coating covering the one or more portions of the biometric sensor electrode that include the conductive material.

9. The wearable computing device of claim 8, wherein the one or more portions of the biometric sensor electrode include at least one of a first portion of the biometric sensor electrode that is positioned on the top surface of the cover or a second portion of the biometric sensor electrode that is positioned on the bottom surface of the cover.

10. The wearable computing device of claim 8, wherein the physical vapor deposition defined coating is at least partially radio frequency transparent.

11. The wearable computing device of claim 8, wherein a gap defined between the physical vapor deposition defined coating and an edge of an active display area of the display screen is narrower than a gap defined between the biometric sensor electrode and the edge of the active display area.

12. The wearable computing device of claim 11, wherein the gap defined between the biometric sensor electrode and the edge of the active display area is greater than 1 millimeter.

13. The wearable computing device of claim 1, wherein the conductive material comprises a silver material.

14. A wearable computing device comprising:

a housing;

a printed circuit board at least partially disposed within the housing;

a display screen electrically coupled to the printed circuit board;

a cover positioned on the display screen, the cover comprising a top surface and a bottom surface, the bottom surface comprising a first electrical contact and a second electrical contact, the first electrical contact and the second electrical contact each electrically connected to the printed circuit board; and a first biometric sensor electrode and a second biometric sensor electrode, the first biometric sensor electrode and the second biometric sensor electrode spaced apart from one another on the top surface of the cover, the first biometric sensor electrode wrapping around a first portion of a periphery of the cover and connected to the first electrical contact, the second biometric sensor electrode wrapping around a second portion of the periphery of the cover and connected to the second electrical contact, at least one of the first biometric sensor electrode or the second biometric sensor electrode having one or more portions that include a conductive material capable of carrying a radio frequency current such that at least one of the first biometric sensor electrode or the second biometric sensor electrode are operable as a radio frequency antenna.

15. The wearable computing device of claim 14, wherein:

one or more portion of the first biometric sensor electrode include a first conductive material capable of carrying a first radio frequency current such that the first biometric sensor electrode is operable as a first radio frequency antenna; and one or more portions of the second biometric sensor electrode include a second conductive material capable of carrying a second radio frequency current such that the second biometric sensor electrode is operable as a second radio frequency antenna.

16. The wearable computing device of claim 15, wherein at least one of the first conductive material or the second conductive material comprises a silver material.

17. The wearable computing device of claim 15, wherein:

the one or more portions of the first biometric sensor electrode include a first portion of the first biometric sensor electrode that is positioned on the top surface of the cover and a second portion of the first biometric sensor electrode that is positioned on the bottom surface of the cover; and the one or more portions of the second biometric sensor electrode include a first portion of the second biometric sensor electrode that is positioned on the top surface of the cover and a second portion of the second biometric sensor electrode that is positioned on the bottom surface of the cover.

18. The wearable computing device of claim 17, further comprising:

a first physical vapor deposition defined coating covering the first portion of the first biometric sensor electrode or the second portion of the first biometric sensor electrode; and a second physical vapor deposition defined coating covering the first portion of the first biometric sensor electrode or the second portion.

19. The wearable computing device of claim 18, wherein a gap defined between the first biometric sensor electrode and an edge of an active display area of the display screen is wider than a gap defined between the first physical vapor deposition defined coating and the edge of the active display area of the display screen.

20. The wearable computing device of claim 14, further comprising:

a first electrical connector electrically connecting the printed circuit board to the first electrical contact on the bottom surface of the cover; and a second electrical connector electrically connecting the printed circuit board to the second electrical contact on the bottom surface of the cover.

* * * * *